Patented Aug. 1, 1944

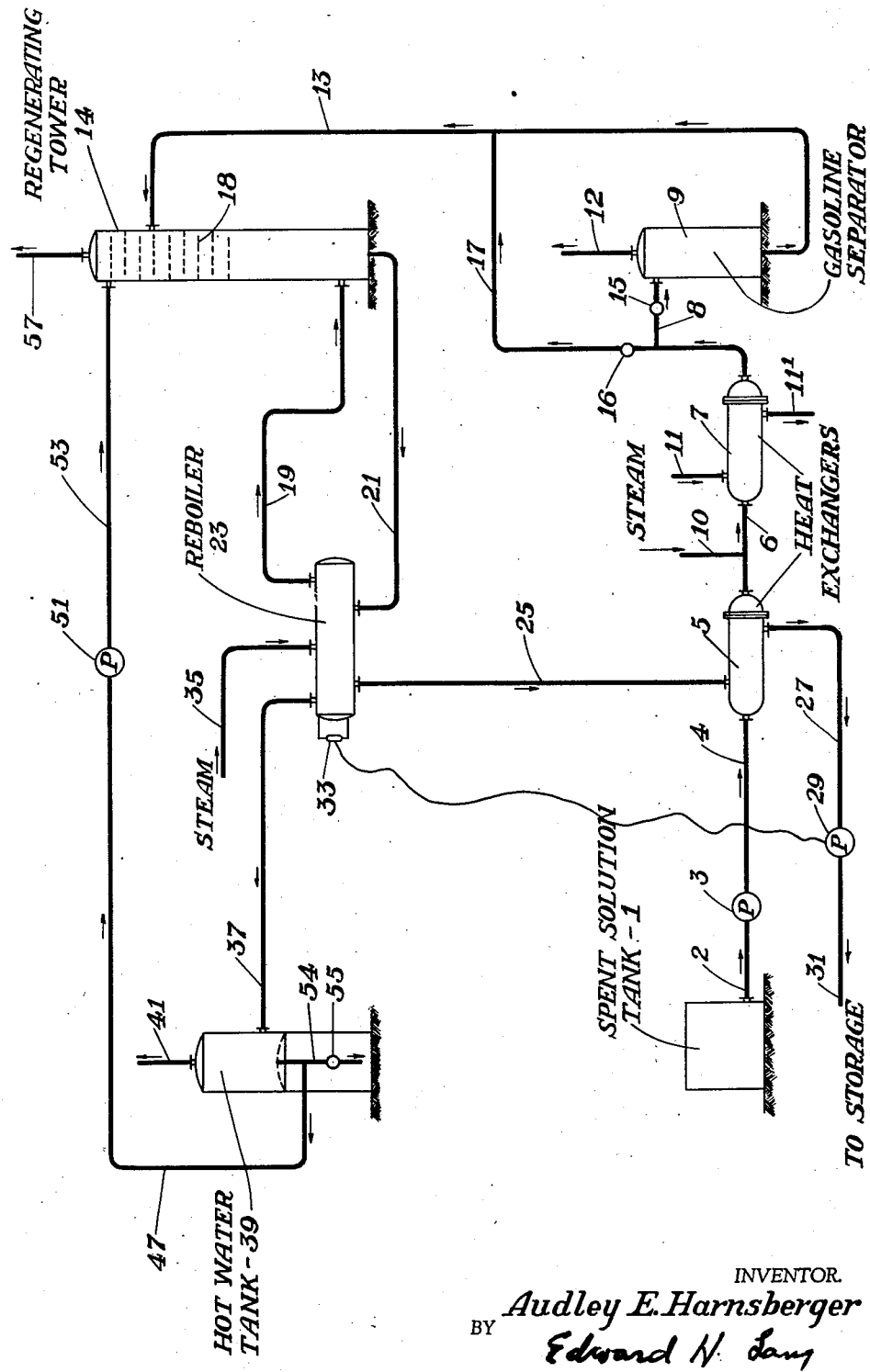

2,354,974

UNITED STATES PATENT OFFICE 2,354,974

REGENERATION OF SPENT TREATING SOLUTIONS

Audley E. Harnsberger, Winnetka, Ill., assignor to The Pure Oil Company, Chicago, Ill., a corporation of Ohio Application April 17, 1941, Serial No. 389,003

14 Claims. (Cl. 23—184)

This invention relates to the regeneration of spent solutions by steam stripping and is particularly adapted to the regeneration of spent aqueous alkali metal hydroxide solutions which have been used to extract mercaptans from petroleum oils.

It is known that various aqueous treating solutions which have been used to extract relatively easily vaporizable components from fluids which are substantially immiscible with the treating solutions, may be regenerated by heating to elevated temperatures with or without the concomitant application of open steam. When open steam is used, the process is generally referred to as a steam stripping process. Generally speaking, this method of regenerating treating reagents is well known in the art. Solutions that may be thus regenerated include aqueous solutions of sodium phenolate and potassium phosphate which have been used to remove hydrogen sulfide from hydrocarbon fluids as well as solutions of relatively non-volatile alkalies, particularly alkali metal hydroxides, which have been used to remove mercaptans from petroleum oils. The alkali metal hydroxide solutions may contain solubility promoters which are employed to increase the solubility of mercaptans in the hydroxide solutions. Mercaptan solubility promoters are those substances which increase the solubility of mercaptans in the alkaline solutions, are readily soluble in the aqueous alkali metal hydroxide solutions, substantially insoluble in hydrocarbon oils, inert to alkalies even at elevated regenerating temperatures and preferably have boiling points appreciably higher than water. Suitable solubility promoters include alkali metal salts of phenols, alkyl phenols and low molecular weight aliphatic acids such as isobutyric acid.

It is an object of this invention to provide a simple and effective method and apparatus for regenerating spent aqueous treating solutions by steam stripping.

It is another object of this invention to provide an improved method of steam stripping spent aqueous alkali metal hydroxide solution which has been used to extract mercaptans from petroleum oils whereby the mercaptan extracting efficiency of the solution is substantially increased.

Other objects and advantages will be apparent from the following detailed description of the invention.

When spent solutions of the type heretofore described are regenerated by steam stripping, it is conventional practice to employ a condenser cooled by circulation of cooling water to effect condensation of vaporized overhead products removed from the stripping zone. These vaporized products are largely water and mercaptans. After condensation the water and mercaptans are allowed to stratify and a portion of the condensed water returned to the upper portion of the stripping zone as reflux.

This invention overcomes disadvantages inherent in the aforementioned conventional process and at the same time provides for a more efficient stripping operation. This is effected by eliminating the condenser ordinarily employed to effect condensation of overhead vapors from the stripping zone and by supplying condensate from a reboiling step as reflux to the stripping zone. Vapors removed from the stripping zone in accordance with this invention are allowed to waste to the atmosphere. Inasmuch as the condenser ordinarily employed for this operation is a relatively expensive piece of equipment, and since the corrosion of this equipment is normally quite high due to the exposure of the equipment to large proportions of sulfur compounds at relatively high temperatures, the improved form of the process which eliminates the necessity of a condenser, effects a substantial savings in equipment and maintenance costs. A further savings is effected in eliminating the cooling water normally required for the extraction of heat from the condenser. At the same time that these economies are effected, a more satisfactory condensate is utilized as reflux in the stripping zone.

Reflux ordinarily employed in the stripping zone of such processes is obtained from the condensation of overhead vapors removed from the top of the stripping zone. This condensate comprises both water and the relatively easily vaporizable components absorbed in the treating operation, such as mercaptans. While free mercaptans may be readily separated from this condensate by stratification, some mercaptans may remain dissolved in the condensate. When this condensate is sent to the stripping zone as reflux, it makes more difficult the task of completely stripping mercaptans from the spent solution. This, of course, is undesirable since it is obviously preferable to have the regenerated solution as free as possible of mercaptans. In accordance with this invention, condensate from steam condensed in a reboiler employed to effect evaporation of water from stripped treating solution and which is mercaptan-free, is supplied to the stripping zone as reflux thereby making possible very complete stripping of mercaptans from the solution being regenerated.

The invention will be more fully understood from the accompanying semi-diagrammatic elevational drawing, the single figure of which represents a preferred form of apparatus useful in the process. Although the invention is applicable to regeneration of various aqueous treating reagents which have been used to extract relatively readily vaporizable components from substantially immiscible fluids, the following description is specifically directed to the regeneration of aqueous alkali metal hydroxide solutions containing solubility promoters which have been used for extracting mercaptans from sour gasoline.

Spent treating solution at a temperature of about 50 to 100° F. is removed from the spent solution accumulator tank 1 through line 2 by means of pump 3 and is charged through line 4, heat exchanger 5, line 6, heat exchanger 7 and line 8 to gasoline separator 9. The temperature of the solution is materially increased, preferably to about 130 to 160° F. in heat exchanger 5. Heat absorbed by the spent solution in heat exchanger 5 is effected by indirect heat exchange with hot regenerated solution as will be subsequently described. The temperature of the solution in line 6 may be further increased and the separation of any dissolved gasoline which may be present, facilitated by supplying additional steam directly to the heated spent solution through line 10 from a steam generating source not shown. The use of direct steam is ordinarily only used on alkali solutions containing solubility promoters since straight aqueous alkali solutions do not dissolve appreciable amounts of gasoline. When straight alkali solutions are employed, further heat may be supplied at this point by indirect heat exchange with steam in heat exchanger 7, although it is not always necessary to supply further heat at this point. Steam is supplied to heat exchanger 7 through line 11 from an outside source, not shown and is withdrawn therefrom through line 11'. The additional heat and the dilution of the spent solution through condensation of steam both aid in bringing about a more complete separation of gasoline from the spent solution. Separated gasoline in either vapor or liquid phase is removed from the top of gasoline separator 9 through line 12 and recovered. Hot spent solution substantially free of gasoline is removed from the bottom of the separator through line 13 and passes to the upper portion of steam stripping regenerating tower 14. Since straight alkali solutions do not dissolve large amounts of gasoline, it may be unnecessary, when using these solutions, to employ gasoline separator 9. In this case the hot alkali solution is by-passed around gasoline separator 9 directly to line 13 and regenerating tower 14 by closing valve 15 in line 8 and opening valve 16 in line 17. The regenerating tower contains means for facilitating contact between vapor and liquid such as bubble plates which are indicated generally at 18. The treating solution flows downwardly through the stripper section countercurrently to stripping steam which enters the regenerating tower near the bottom through line 19. The steam liberates mercaptans which pass off as overhead vapors together with steam. Stripped solution flows from the lower portion of the regenerating tower 14 through line 21 to reboiler 23 which vaporizes water from the solution. Steam thus produced is used for stripping and passes to the regenerating tower through line 19. Regenerated and reconcentrated treating solution is withdrawn from reboiler 23 through line 25, cooled in heat exchanger 5 by indirect heat exchange with relatively cool spent treating solution being charged to the regenerating tower through line 4 and passes through line 27 to pump 29 which charges the solution through line 31 to a regenerated treating solution storage not shown. Pump 29 is adapted to maintain a predetermined liquid level in reboiler 23 by means of liquid level control 33 which varies the speed of pump 29 in accordance with the level of stripped solution in the reboiler.

Steam from a steam generating source, not shown, is supplied to reboiler 23 through line 35 whereby to heat the stripped solution therein by means of indirect heat exchange which vaporizes water of dilution present in the stripped solution and generates steam required in the stripping zone for stripping mercaptans from spent treating solution charged to the regenerating tower. Hot condensate obtained from steam employed as a source of heat in the reboiler and which may contain varying quantities of uncondensed steam, is removed from the reboiler through line 37 and passed to hot water accumulator tank 39. This tank is equipped with a vent 41 to avoid the creation of any excess pressure in the tank which might otherwise occur when steam is supplied at a high rate to the reboiler. Hot water is withdrawn from hot water tank 39 through line 47 by pump 51 and is charged through line 53 to the upper portion of regenerating tower 15 as reflux. The amount of water added as reflux ordinarily does not exceed that which is removed by vaporization in reboiler 23. Otherwise, the regenerated solution would become more and more dilute and ultimately incapable of removing a reasonable amount of mercaptans from sour oils. Excess hot water not required for reflux may be withdrawn from hot water tank 39 through line 54 and valve 55 and removed from the system. The reflux thus provided for the stripping section of regenerating tower 14 is mercaptan-free since there is no opportunity for the water employed as reflux to contact mercaptans or mercaptan bearing material. Overhead vapors from tower 14 not condensed by the reflux condensate are removed from the top of the tower through line 57 and are allowed to waste to the atmosphere at a convenient point or may be conveyed to a suitable burner and burned thus readily and economically disposing of the mercaptans.

It will thus be seen that the objects of the invention have been accomplished since the process does not require a condenser or cooling water for effecting condensation of vaporized overhead products from the regenerating tower in order to provide hot condensate for reflux to the stripping zone. Furthermore, an economical means of securing mercaptan-free hot condensate for reflux to the stripping zone has been provided.

In a typical operation, spent sodium hydroxide solution containing about 12 percent by weight of sodium hydroxide and approximately 0.25 percent by weight of mercaptan sulfur, is withdrawn from a spent solution storage tank at a temperature of about 60 to 100° F. at a rate of about 20 to 30 barrels per hour. The spent solution is heated by indirect heat exchange with hot regenerated solution removed from the lower portion of the regenerating tower and is further heated to a temperature of about 220° F. by indirect heat exchange with steam at which temperature it is charged to an upper portion of the regenerating tower. The regenerating tower operates at a pressure of about 4 pounds per square inch. The reboiler ordinarily operates at a temperature of about 240 to 245° F. Steam is fed to the reboiler at a temperature of about 400° F. in quantities of about 180 to 200 pounds per barrel of spent solution charged to the regenerating tower.

Condensate obtained from steam fed to the reboiler is charged to the top of the regenerating tower at a temperature of about 200° F. as reflux at a rate of about 150 to 200 gallons per hour. Hot regenerated concentrated sodium hydroxide solution leaves the reboiler and passes in indirect heat exchange with spent solution charged to the tower as previously described. The regenerated solution leaves this exchanger at a temperature of about 110° F. and contains about 0.06 percent by weight of mercaptan sulfur.

While in the foregoing description a preferred mode of operation has been set forth, it is to be understood that many modifications are possible without departing from the spirit of the invention.

I claim:

1. In the process of regenerating by steam stripping spent aqueous treating reagent regeneratable by steam stripping, the steps comprising stripping the spent reagent of said undesirable vaporizable components in a stripping zone to produce a stripped solution of reduced content of said undesirable vaporizable components and overhead vapors, heating the stripped solution by indirect heat exchange with steam under conditions to vaporize a portion of the stripped solution to supply steam for the stripping operation and to condense at least a portion of said steam and employing condensate from said heat exchange step as reflux for contacting overhead vapors in the stripping zone.

2. In the process of regenerating by steam stripping spent aqueous alkaline reagent regeneratable by steam stripping, the steps comprising stripping the spent reagent of vaporizable acidic components in a stripping zone to produce a stripped solution containing a reduced amount of vaporizable acidic components and overhead vapors, heating the stripped solution by indirect heat exchange with steam under conditions to condense at least a portion of said steam and contacting overhead vapors in the stripping zone with condensate from said heat exchange step.

3. Process in accordance with claim 2 in which the stripped solution is removed from the stripping zone for the heating by indirect heat exchange with steam.

4. In the process of regenerating by steam stripping spent aqueous alkali metal hydroxide solution containing mercaptides, the steps comprising stripping the spent solution in a stripping zone to produce a stripped solution of reduced mercaptide content and overhead vapors, heating the stripped solution by indirect heat exchange with steam under conditions to condense at least a portion of said steam and contacting overhead vapors in the stripping zone with condensate obtained from said steam in said heat exchange step.

5. Process in accordance with claim 4 in which the amount of condensate supplied to the stripping zone is not in excess of the amount of water removed from the stripping zone in the overhead vapors.

6. Process in accordance with claim 4 in which the amount of condensate supplied to the stripping zone is less than the amount of water removed from the stripping zone in the overhead vapors.

7. Process in accordance with claim 4 in which spent solution charged to the process is heated sufficiently to vaporize the gasoline contained therein and gasoline is separated therefrom prior to said stripping steps.

8. Process in accordance with claim 2 in which the stripped solution is heated to a sufficient degree to convert a substantial amount of the solution into steam and said steam is supplied to the stripping zone as a stripping medium.

9. Process in accordance with claim 4 in which the stripped solution is heated to a sufficient degree to convert a substantial amount of the solution into steam and said steam is supplied to the stripping zone as a stripping medium.

10. In the process of regenerating by steam stripping, spent aqueous alkali metal hydroxide solution containing mercaptides, the steps comprising stripping the spent solution of mercaptides by counter-current contact with steam, generating steam for the stripping operation by indirect heating of the partially stripped solution by means of steam under conditions such that at least a portion of the steam used for indirect heating is condensed and utilizing condensed steam from the indirect heating step as reflux in the counter-current steam stripping operation.

11. The method of regenerating spent aqueous alkali metal hydroxide solution containing mercaptides and gasoline comprising heating the solution to a temperature sufficient to vaporize gasoline from the aqueous solution and separating gasoline from the aqueous solution, then contacting the remaining solution with open steam to convert mercaptides to mercaptans and separate the latter as vapors from the solution, and utilizing hot regenerated solution for heating said spent solution prior to separation therefrom of the gasoline.

12. Method in accordance with claim 11 in which the spent solution is regenerated in a fractionating zone using water as reflux and the amount of water added as reflux is substantially equivalent to the amount of water removed as steam from the solution undergoing regeneration.

13. Method in accordance with claim 11 in which the spent solution is regenerated in a fractionating zone, the steam for regenerating the spent solution is generated by indirectly heating solution withdrawn from said zone with steam from a separate source at higher temperature than said solution, the steam after being used for heating is at least in part condensed, and resulting condensate used as reflux in the regenerating zone.

14. The method of regenerating mercaptide-containing spent alkali metal hydroxide solution comprising preheating said solution by indirect heat exchange with hot regenerated solution, passing preheated solution to a regenerating zone and therein stripping mercaptans from the solution by means of direct contact with steam, generating steam for the stripping operation by heating solution, after it leaves the regenerating zone but before exchange with spent solution, with steam from a separate source, condensing at least a portion of said last mentioned steam after it has served to heat said solution and introducing resulting condensate into the regenerating zone.

AUDLEY E. HARNSBERGER.